United States Patent
Caire et al.

(10) Patent No.: US 8,451,951 B2
(45) Date of Patent: May 28, 2013

(54) CHANNEL CLASSIFICATION AND RATE ADAPTATION FOR SU-MIMO SYSTEMS

(75) Inventors: Giuseppe Caire, South Pasadena, CA (US); Carl-Erik W. Sundberg, Sunnyvale, CA (US); Haralabos Papadopoulos, San Jose, CA (US); Sean A. Ramprashad, Los Altos, CA (US)

(73) Assignee: NTT DoCoMo, Inc., Tokyo (JP)

( * ) Notice: Subject to any disclaimer, the term of this patent is extended or adjusted under 35 U.S.C. 154(b) by 879 days.

(21) Appl. No.: 12/538,736

(22) Filed: Aug. 10, 2009

(65) Prior Publication Data

US 2010/0040163 A1 Feb. 18, 2010

Related U.S. Application Data

(60) Provisional application No. 61/089,098, filed on Aug. 15, 2008.

(51) Int. Cl.
*H04L 27/06* (2006.01)
*H04B 1/00* (2006.01)

(52) U.S. Cl.
USPC .......................................... 375/340; 455/69

(58) Field of Classification Search
USPC .............. 375/259, 260, 261, 262, 265, 267, 375/271, 285, 295, 298, 299, 300, 302, 316, 375/322, 324, 340, 341, 346, 347, 354, 358; 370/208, 210; 455/7, 24, 39, 68, 69
See application file for complete search history.

(56) References Cited

U.S. PATENT DOCUMENTS

| | | | |
|---|---|---|---|
| 5,903,842 | A | 5/1999 | Wang et al. |
| 5,982,327 | A | 11/1999 | Vook et al. |

(Continued)

FOREIGN PATENT DOCUMENTS

| | | |
|---|---|---|
| EP | 1162750 A2 | 12/2001 |
| EP | 1383246 A2 | 1/2004 |

(Continued)

OTHER PUBLICATIONS

US Final Office Action for U.S. Appl. No. 11/873,248, dated Sep. 1, 2010, 21 pages.

(Continued)

*Primary Examiner* — David C. Payne
*Assistant Examiner* — Vineeta Panwalkar
(74) *Attorney, Agent, or Firm* — Blakely, Sokoloff, Taylor & Zafman LLP

(57) ABSTRACT

A method, apparatus and system are disclosed herein for channel classification and adaptation. In one embodiment, the system comprises a base station having a transmitter that is operable to transmit wireless signals using a plurality of transmission options; and a user terminal having a receiver that is operable to receive and decode wireless signals using a plurality of receiver algorithms, where the user terminal is operable to receive communications from the transmitter over a multiple-input, multiple output (MIMO) channel, to select at least one coding mode to be used by the transmitter on the channel based on rates achievable using MIMO transmission, in view of the channel information, using different combinations of one of the plurality of receiver algorithms and one of the plurality of transmission options, and to send information to identify the at least one coding mode to the base station using a feedback channel, each coding mode specifying at least an encoder to be used by the transmitter for the channel.

23 Claims, 5 Drawing Sheets

U.S. PATENT DOCUMENTS

| | | | |
|---|---|---|---|
| 6,182,264 B1* | 1/2001 | Ott | 714/774 |
| 6,629,287 B1 | 9/2003 | Brink | |
| 6,804,307 B1 | 10/2004 | Popovic | |
| 6,862,552 B2 | 3/2005 | Goldstein et al. | |
| 6,901,117 B1 | 5/2005 | Classon et al. | |
| 6,976,087 B1 | 12/2005 | Westfall et al. | |
| 7,042,856 B2 | 5/2006 | Walton et al. | |
| 7,042,858 B1 | 5/2006 | Ma et al. | |
| 7,072,295 B1 | 7/2006 | Benson et al. | |
| 7,095,812 B2 | 8/2006 | Chan et al. | |
| 7,251,768 B2 | 7/2007 | Giannakis et al. | |
| 7,308,047 B2 | 12/2007 | Sadowsky | |
| 7,310,369 B1 | 12/2007 | Krieger et al. | |
| 7,436,895 B1 | 10/2008 | Tujkovic | |
| 7,441,045 B2 | 10/2008 | Skene et al. | |
| 7,443,925 B2 | 10/2008 | Mehta et al. | |
| 7,564,915 B2 | 7/2009 | Lee et al. | |
| 7,620,117 B2 | 11/2009 | Chae et al. | |
| 7,877,097 B2 | 1/2011 | Zhu et al. | |
| 7,877,108 B2 | 1/2011 | Wengerter et al. | |
| 8,027,407 B2 | 9/2011 | Papadopoulos | |
| 8,042,031 B2 | 10/2011 | Chen et al. | |
| 2002/0114404 A1 | 8/2002 | Aizawa et al. | |
| 2002/0176431 A1 | 11/2002 | Golla et al. | |
| 2003/0002505 A1 | 1/2003 | Hoch et al. | |
| 2003/0236080 A1 | 12/2003 | Kadous et al. | |
| 2004/0022179 A1 | 2/2004 | Giannakis et al. | |
| 2004/0042400 A1 | 3/2004 | Horlin et al. | |
| 2004/0116146 A1 | 6/2004 | Sadowsky et al. | |
| 2004/0165675 A1 | 8/2004 | Ito et al. | |
| 2004/0205445 A1 | 10/2004 | Xu | |
| 2005/0010675 A1 | 1/2005 | Jaggi | |
| 2005/0041751 A1 | 2/2005 | Nir et al. | |
| 2005/0047514 A1 | 3/2005 | Bolinth et al. | |
| 2005/0068918 A1 | 3/2005 | Mantravadi et al. | |
| 2005/0111592 A1 | 5/2005 | Yee | |
| 2005/0185707 A1 | 8/2005 | Hoo et al. | |
| 2005/0265280 A1 | 12/2005 | Roh et al. | |
| 2006/0002312 A1 | 1/2006 | Delattre et al. | |
| 2006/0020560 A1 | 1/2006 | Rodriguez et al. | |
| 2006/0029124 A1 | 2/2006 | Grant et al. | |
| 2006/0098760 A1 | 5/2006 | Shen et al. | |
| 2006/0146716 A1 | 7/2006 | Lun et al. | |
| 2006/0146791 A1 | 7/2006 | Deb | |
| 2006/0148506 A1 | 7/2006 | Hoo | |
| 2006/0152391 A1 | 7/2006 | Sakuyama | |
| 2006/0176945 A1 | 8/2006 | Li | |
| 2006/0276217 A1* | 12/2006 | Khojastepour et al. | 455/522 |
| 2007/0041475 A1 | 2/2007 | Koshy et al. | |
| 2007/0066229 A1 | 3/2007 | Zhang et al. | |
| 2007/0156919 A1 | 7/2007 | Potti et al. | |
| 2007/0198899 A1 | 8/2007 | Yellin et al. | |
| 2007/0213013 A1 | 9/2007 | Kim | |
| 2007/0223423 A1* | 9/2007 | Kim et al. | 370/334 |
| 2007/0281633 A1 | 12/2007 | Papadopoulos | |
| 2007/0286313 A1 | 12/2007 | Nikopour-Deilami et al. | |
| 2008/0025430 A1 | 1/2008 | Sadowsky | |
| 2008/0032630 A1 | 2/2008 | Kim et al. | |
| 2008/0075022 A1 | 3/2008 | Lei et al. | |
| 2008/0092028 A1 | 4/2008 | Orio | |
| 2008/0101310 A1 | 5/2008 | Marzetta | |
| 2008/0123781 A1 | 5/2008 | Pisek et al. | |
| 2008/0181339 A1 | 7/2008 | Chen et al. | |
| 2008/0212526 A1 | 9/2008 | Oyman | |
| 2009/0082054 A1 | 3/2009 | Li et al. | |
| 2009/0213954 A1 | 8/2009 | Bursalioglu et al. | |
| 2009/0225878 A1 | 9/2009 | Papadopoulos et al. | |
| 2009/0268684 A1 | 10/2009 | Lott et al. | |
| 2009/0285323 A1 | 11/2009 | Sundberg et al. | |
| 2009/0291699 A1 | 11/2009 | Heath et al. | |
| 2009/0296842 A1 | 12/2009 | Papadopoulos et al. | |

FOREIGN PATENT DOCUMENTS

| | | |
|---|---|---|
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 | 6/2001 |
| WO | WO 2004/045167 A | 5/2004 |
| WO | WO 2004/025011 A | 7/2004 |
| WO | WO 2005/046081 A1 | 5/2005 |
| WO | WO 2006/029050 A | 3/2006 |
| WO | WO 2007/050860 A1 | 5/2007 |
| WO | WO 2007/073267 A1 | 6/2007 |
| WO | WO 2004/056011 A1 | 7/2007 |
| WO | WO 2007/087540 A2 | 8/2007 |
| WO | WO 2007/129990 A1 | 11/2007 |
| WO | WO 2008/057791 A1 | 5/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

US Office Action for U.S. Appl. No. 11/939,353 dated Jan. 31, 2011, 15 pages.

Sen, et al., "Cute and jCUTE Concolic Unit Testing and Explicit Path Model-Checking Tool", Computer Aided Verification Lecture Notes in Computer Science, Jan. 1, 2006, pp. 419-423.

Majumdar, et al., "Hybrid Concolic Testing", IEEE 29th International Conference on Software Engineering, May 1, 2007, pp. 416-426.

PCT International Preliminary Report on Patentability for PCT Patent Application No. PCT/US2009/046014, dated Dec. 16, 2010, 9 pages.

PCT International Search Report for PCT Patent Application No. PCT/US2010/033549, Jan. 5, 2011, 5 pgs.

PCT Written Opinion of the International Searching Authority for PCT Patent Application No. PCT/US2010/033549, Jan. 5, 2011, 6 pgs.

European Office Action for European Patent Application No. 08767750.6, dated Jan. 12, 2011, 6 pgs.

PCT International Search Report for PCT Patent Application No. PCT/US2010/027139, Dec. 6, 2010, 5 pgs.

PCT Written Opinion of the International Searching Authority for PCT Patent Application No. PCT/US2010/027139, Dec. 6, 2011, 6 pgs.

European Office Action for European Patent Application No. 08767751.4, Jan. 14, 2011, 5 pgs.

US Office Action for U.S. Appl. No. 11/644,638, dated Sep. 22, 2009, 13 pages.

PCT International Preliminary Report on Patentability for PCT Patent Application No. PCT/US2007/013074, dated Dec. 30, 2009, 8 pages.

PCT International Search Report for PCT Patent Application No. PCT/US2008/006287, dated Oct. 2, 2008, 6 pgs.

Written Opinion of the International Searching Authority for PCT Patent Application No. PCT/US2008/006287, dated Oct. 2, 2008, 7 pgs.

PCT International Preliminary Report on Patentability for PCT Patent Application No. PCT/US2008/065675, dated Dec. 17, 2009, 8 pages.

PCT International Search Report for PCT Patent Application No. PCT/US2009/054937, dated Dec. 30, 2009, 7 pgs.

Written Opinion of the International Searching Authority for PCT Patent Application No. PCT/US2009/054937, dated Dec. 30, 2009, 7 pgs.

Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.

PCT International Search Report for PCT Patent Application No. PCT/US2009/56865, dated Mar. 2, 2010, 7 pgs.

Written Opinion of the International Searching Authority for PCT Patent Application No. PCT/US2009/56865, dated Mar. 2, 2010, 12 pgs.

PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
Sun, Sumei, et al., "Pseudo-Inverse MMSE Based QRD-M Algorithm for MIMO OFDM", Jan. 1, 2006, pp. 1545-1549, vol. 3.
Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.
US Office Action for U.S. Appl. No. 12/538,733, Oct. 18, 2011, 11 pgs.
US Office Action for U.S. Appl. No. 12/538,739, Dec. 7, 2011, 23 pgs.
US Final Office Action for U.S. Appl. No. 12/538,733, Mar. 27, 2012, 6 pgs.
US Final Office Action for U.S. Appl. No. 12/335,409, Mar. 19, 2012, 22 pgs.
US Office Action for U.S. Appl. No. 12/335,389, Apr. 12, 2012, 20 pgs.
PCT International Preliminary Report on Patentability for PCT Patent Application No. PCT/US2010/033549, Nov. 17, 2011, 7 pgs.
US Notice of Allowance for U.S. Appl. No. 11/754,903, Mar. 12, 2012, 8 pgs.
US Final Office Action for U.S. Appl. No. 12/209,110, dated Jul. 14, 2011, 26 pgs.
US Office Action for U.S. Appl. No. 12/335,409, dated Aug. 16, 2011, 20 pgs.
US Notice of Allowance for U.S. Appl. No. 11/664,638, dated Jun. 9, 2011, 10 pgs.
US Office Action for U.S. Appl. No. 11/754,903, dated Jun. 6, 2011, 11 pgs.
Alamouti, Siavash M., "A Simple Transmit Diversity Technique for Wireless Communications", IEEE Journal on Select Areas in Communications, vol. 16, No. 8, Oct. 1998, pp. 1451-1458.
Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.
Wong, K., "The Soft-Output M-Algorithm and Its Applications", PhD Thesis, Queens University, Kingston, Canada, Aug. 2006, 263 pages.
Lee, Inkyu, et al., "Space-Time Bit-Interleaved Coded Modulation for OFDM Systems", IEEE Transactions on Signal Processing, vol. 52, No. 3, Mar. 2004, pp. 820-825.
Lee, Heunchul, et al., "A Flexible Space-Time Coding System with Unequal Error Protection", IEEE, 2005, 5 pages.
Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.
Lee, Inkyu, et al., "Code Construction for Space-Time Bit-Interleaved Coded Modulation Systems", IEEE Communications Society, 2004, 5 pages.
Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.
Stiglmayr, S., et al., "Adaptive Coding and Modulation in OFDM Systems Using BICM and Rate-Compatible Punctured Codes", 7 pages, Apr. 2007
US Office Action for U.S. Appl. No. 11/873,248, dated Mar. 31, 2010, 18 pages.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
PCT International Preliminary Report on Patentability for PCT Patent Application No. PCT/US2008/073646, dated Mar. 4, 2010, 6 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
US Office Action for U.S. Appl. No. 12/209,110 dated Feb. 11, 2011, 20 pages.
US Office Action for U.S. Appl. No. 12/121,649, Apr. 19, 2011, 25 pgs.
US Office Action for U.S. Appl. No. 12/130,821, Feb. 22, 2011, 12 pgs.
US Office Action for U.S. Appl. No. 12/121,634, Mar. 1, 2011, 19 pgs.
US Office Action for U.S. Appl. No. 11/644,638, Apr. 15, 2011, 7 pgs.
European Office Action for European Patent Application No. 09718026.9, Feb. 10, 2011, 3 pgs.
European Office Action for European Patent Application No. 08756664.2, Mar. 17, 2011, 6 pgs.
US Final Office Action for U.S. Appl. No. 11/644,638, dated Apr. 29, 2010, 22 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
US Final Office Action for U.S. Appl. No. 12/040,653, dated Jun. 15, 2010, 40 pages.
US Office Action for U.S. Appl. No. 11/644,638, dated Sep. 30, 2010, 24 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 11/939,353, dated Sep. 22, 2010, 15 pages.
PCT International Search Report dated Sep. 18, 2008, for PCT/US08/006286, filed May 16, 2008, 4 pages.
Written Opinion of the International Searching Authority dated Sep. 18, 2008, for PCT/US08/006286, filed May 16, 2008, 8 pages.
International Search Report mailed Nov. 6, 2008 for PCT/US08/065675, filed Jun. 3, 2008, 5 pages.
Written Opinion of the International Searching Authority mailed Nov. 6, 2008 for PCT/US08/065675, filed Jun. 3, 2008, 8 pages.
International Search Report for related application WO 08/04865, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
PCT International Search Report dated Apr. 14, 2008 for PCT/US07/23207, 3 pages.
Written Opinion of the International Searching Authority dated Apr. 14, 2008 for PCT/US07/23207, 6 pages.
International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.
International Search Report dated Apr. 17, 2009 for PCT/US2008/076252, 5 pages.
Written Opinion of the International Searching Authority dated Apr. 17, 2008 for PCT/US2008/076252, 9 pages.

Written Opinion of the International Searching Authority dated Apr. 30, 2009 for PCT/US2007/022189, 8 pages.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
Lattice Semiconductor Corp., "Turbo Decoder", IP Data Sheet, 2003, 6 pages.
Kao, Chien-Yu, "A Bi-directional SOVA with Normalization for Turbo Decoding", Jun. 2006, Tainan, Taiwan, 72 pages.
Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.
Hagenauer, Joachim, et al., "The Performance of Rate-Compatible Punctured Convolution Codes for Digital Mobile Radio", IEEE Transactions on Communications, vol. 38, No. 7, Jul. 1990, pp. 966-980.
Lee, Inkyu, et al., "Code Construction for Space-Time Bit-Interleaved Coded Modulation Systems", IEEE Communications Society, 2004, 5 pages.
Lee, Inkyu, et al., "Code Design of Space-Time Bit-Interleaved Coded Modulation Systems for Maximum Diversity", ICC, Jun. 2004, 11 pages.
Taddei, Herve, et al., Mode Adaptive Unequal Error Protection for Transform Predictive Speech and Audio Coders, IEEE, 2002, pp. 165-168.
Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.
Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.
Seshadri, N., et al., "List Viterbi Decoding Algorithms with Applications", IEEE Transactions on Communications, vol. 42, No. 2/3/4, Feb./Mar./Apr. 1994, pp. 313-323.
Taoka, H., e al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.
Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.
Wong, K.K.Y., et al., "Low-complexity space-time turbo equalizer with the soft-output M-algorithm for frequency-selective channels", IEEE International Conference on Communications, vol. 4, May 2005, pp. 2251-2255.
Wong, K.K.Y., et al., "Bi-directional soft-output m-algorithm or iterative decoding", IEEE International Conference on Communications, vol. 2, Jun. 2004, pp. 792-797.
Kitty K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.
Papadopoulos, H., et al., "Wideband space-time coded systems with non-collocated antennas" Radio and Wireless Symposium, 2008 IEEE, Jan. 22, 2008, pp. 307-310.
Lee, Inkyu, et al., "Diversity Analysis for Space-Time, Bit-Interleaved Coded Modulation Systems", Korea University, Seoul, Korea, Jan. 2007.
Gencata, et al., "Virtual-topology adaptation for WDM mesh networks under dynamic traffic," Proceedings of IEEE Infocom 2002, vol. 1, Jun. 23, 2002, pp, 48-56.
Koetter, R., et a ., "Beyond routing: an algebraic approach to network coding," Proceedings of IEEE Infocom 2002, Vol, 1, Jun. 23, 2002, pp. 122-130.

Del Re, Enrico, et al., "Next-Generation Mobile Satellite Networks," IEEE Communications Magazine, vol. 40, No. 9, Sep. 1, 2002, pp. 150-159.
Ernest, P.H.H., et al., "An efficient algorithm for virtual topology reconfiguration in WDM optical ring networks," Proceedings of the 10th Conference on Computer Communications and Networks, Oct. 15, 2001, pp. 55-60.
Fasolo, E., "Network coding techniques," www.cs.virginia.edu/{yw5s/Network%20coding.ppt, Mar. 7, 2004, pp. 1-14.
Chou, P.A., et al., "Network Coding for the Internet and Wireless Networks", www.eecs.umich.edu/systems/ChouSeminar.ppt, Mar. 28, 2006, pp. 1-29.
Ahlswede, R., et al., "Network Information Flow", IEEE Transactions on Information Theory, IT-46(4), Jul. 2000, pp. 1204-1216.
Ho, T., et al., "The Benefits of Coding Over Routing in a Randomized Setting", in the Proceedings of the International Symposium on Information Theory (ISIT), Jun. 2003, pp. 1-6.
Katti, S., et al., "XORs in the Air: Practical Wireless Network Coding", in the Proceedings of the ACM Special Interest Group on Data Communication (SIGCOMM), Sep. 2006, 12 pages.
Koetter, R., et al., "An Algebraic Approach to Network Coding", IEEE/ACM Transactions on Networking, vol. 11, No. 5, Oct. 2003, pp. 782-795.
Li, S. R., et al., "Linear Network Coding", IEEE Transactions on Information Theory, IT-49(2), Feb. 2003, pp. 371-381.
Chou, P.A., et al., "Practical Network Coding", 51st Allerton Conference on Communication, Control and Computing, Oct. 2003, 10 pages.
Cormen, T.H., et al., "Introduction to Algorithms", 2nd Edition, MIT Press and McGraw-Hill, 2001, pp. 643-700.
Jafarkani, H., "Space-Time Coding, Theory and Practice", Cambridge University Press, 2005.
Yiu, S., et al., "Distributed Block Source Coding", IEEE GLOBECOM 2005 Proceedings, Nov. 2005.
Su, W,, et al,, "Signal Constellations for Quasi-Orthogonal Space-Time Block Codes with Ful Diversity", IEEE Transactions on Information Theory, Oct. 2004, pp. 2231-2347.
Jafarkani, H., "A Quasi-Orthogonal Space-Time Block Code", IEEE Trnsactions on Communications, Jan. 2001, 4 pages.
Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.
Sharma, N. et al.: "Improved Quasi-Orthogonal Codes Through Constellation Rotation," IEEE Trans. Communications, pp. 332-335, Mar. 2003, 3 pages.
Wang, H. et al.: "Upper Bounds of Rates of Space-Time Block Codes from Complex Orthogonal Designs," IEEE Trans, Information Theory, pp. 2788-2796, Oct. 2003, 9 pages.
El Gamal, H. et al., "Distributed Space-Time Filtering for Cooperative Wireless Networks", GLOBECOM'03, Dec. 2003, pp. 1826-1830.
Sezgin, A., et al., "On EXIT-Chart Analysis of Coherent and Non-Coherent Space-Time Codes", Smart Antennas, 2004, pp. 49-56.
Horn, R.A., et al., "Matrix Analysis", Cambridge University Press, Ne York, 1994.
Tse, D., et al., "Fundamentals of Wireless Communication", Cambridge University Press, May 2005.
Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.
Guerin, R., et al., "Quality-of-Service in Packet Networks: Basic Mechanisms and Directions", Invited Paper, Computer Networks, vol. 31, No. 3, Feb. 1999, pp. 1-16.
Zhang, H., "Service Disciplines for Guaranteed Performance Service in Packet-Switching Networks", in the Proceedings of the IEEE, vol. 83, No. 10, Oct. 1995, pp. 1-23.
Caire, G., et al., "Achievable Throughput MIMO Downlink Beamforming and Limited Channel Information", Proceedings of IEEE PIMRC, Aug. 2007.
Medard, M., "The Effect upon Channel Capacity in Wireless Communication of Imperfect Knowledge of the Channel", IEEE Transactions on Information Theory, May 2000, pp. 935-945.

Marzetta, T.L., "How Much Training Is Required for Multi-User MIMO?", ACSSC96, Asilomar Conference Oct. 2006.
Viswanath, P., et al., "Sum Capacity of the Multiple Antenna Gaussian Broadcast Channel and Uplink-Downlink Duality", IEEE Transactions on Information Theory, Aug. 2003, pp. 1912-1923.
Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.
Joham, M., et al., "Linear Transmit Processing in MIMO Communications Systems", IEEE Transactions on Signal Processing, Aug. 2005, pp. 2700-2712.
Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.
Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.
Catt, "Non-codebook based pre-coding for E-UTRA TDD Downlink", 3rd Generat on Partnership Project, Oct. 4, 2006, pp. 1-3.
Gomadam, K.S., et al., "Techniques for Multi-user MIMO with Two-way Training", IEEE International Conference on Communications, May 19, 2008, pp. 3360-3366.
Michalke, Clemens, et al., "Linear MOMO Receivers vs. Tree Search Detection: a Performance Comparison Overview", IEEE Internatinal Symposium on Personal, Indoor and Mobile Radio Communications, Sep. 11, 2006, pp. 1-7.
Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
Stiglmayr, Stephan, et al., "Adaptive Coding and Modulation in OFDM Systems using BICM and Rate-Compatible Punctured Codes", 7 pages, Apr. 2007.
G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.
US Office Action for U.S. Appl. No. 12/040,653, dated Dec. 11, 2009, 33 pages.
PCT International Preliminary Report on Patentability for PCT Patent Application No. PCT/US2008/003274, dated Sep. 24, 2009, 10 pages.
PCT International Search Report for PCT Patent Application No. PCTIUS2007/013074, dated Dec. 2, 2009, 8 pgs.
Written Opinion of the International Searching Authority or PCT Patent Application No. PCT/US2007/013074, dated Dec. 2, 2009, 8 pgs.
PCT International Search Report for PCT Patent Application No. PCT/US20091046014, dated Nov. 27, 2009, 7 pgs.
Written Opinion of the International Searching Authority for PCT Patent Application No. PCT/US2009/046014, dated Nov. 27, 2009, 8 pgs.
G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins Universit , Baltimore, MD, USA, Mar. 2005.

Yiu, S., et al., "Distributed Space-Time Block Coding For Cooperative Networks With Multiple Antenna Nodes", Computational Advances in Multi-Sensor Adaptive Processing, Dec. 13, 2005, pp. 52-55.
Yiu, Simon, et al., "Optimization of Distributed Space-Time Filtering", IEEE 62nd Vehicular Technology Conference, Sep. 2005, pp. 1829-1833, Piscataway, New Jersey, USA.
Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.
Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jerse , USA.
Papadogiannis, et al., "A Dynamic Clustering Approach in Wireless Networks with Multi-Cell Cooperative Processing", IEEE International Conference on Communications, May 19, 2008, pp. 4033-4037.
PCT International Preliminary Report on Patentability for PCT Patent Application No. PCT/US2009/053466, dated Feb. 24, 2011, 9 pages.
PCT International Preliminary Report on Patentability for PCT Patent Application No. PCT/US2009/053471, dated Feb. 24, 2011, 9 pages.
PCT International Preliminary Report on Patentability for PCT Patent Application No. PCT/US2009/054937, dated Mar. 10, 2011, 8 pages.
PCT International Preliminary Report on Patentability for PCT Patent Application No. PCT/US2009/056865, dated Mar. 24, 2011, 12 pgs.
European Office Action for European Patent Application No. 07862325.3, Apr. 7, 2011, 6 pgs.
US Notice of Allowance for U.S. Appl. No. 12/538,733, dated Apr. 26, 2012 , 6 pgs.
US Office Action for U.S. Appl. No. 12/476,066, dated May 30, 2012 , 14 pgs.
US Notice of Allowance for U.S. Appl. No. 12/335,409, dated Jul. 19, 2012 , 8 pgs.
US Office Action for U.S. Appl. No. 12/546,471, dated May 21, 2012 , 11 pgs.
US Office Action for U.S. Appl. No. 12/209,110, dated Jun. 12, 2012 , 39 pgs.
US Notice of Allowance for U.S. Appl. No. 11/644,638, dated Jun. 9, 2011 , 11 pgs.
US Notice of Allowance for U.S. Appl. No. 12/121,634, dated Aug. 12, 2011 , 9 pgs.
Li, et al., "Full Diversity Distributed Space-Time Trellis Codes for Asynchronous Cooperative Communications", Proceeding of the IEEE 2005 International Symposium on Information Theory, Sep. 4, 2005, 6 pgs., Adelaide, South Australia, Australia.
Jing, et al., "Distributed Space-Time Codes in Wireless Relay Networks", 2004 IEEE Sensor Array and Multichannel Signal Processing Workshop, Jul. 21, 2004, pp. 249-253.
Japanese Office Action for related Japanese Patent Application No. 2009-513327, Aug. 7, 2012, 3 pgs. *English Translation*.

* cited by examiner

| 1000 ○ | 1011 ○ | 1100 ○ | 1111 ○ |
| 0001 ○ | 0010 ○ | 0101 ○ | 0110 ○ |
| 0100 ○ | 0111 ○ | 0000 ○ | 0011 ○ |
| 1101 ○ | 1110 ○ | 1001 ○ | 1010 ○ |

CHANNEL CLASSIFICATION AND RATE ADAPTATION FOR SU-MIMO SYSTEMS

PRIORITY

The present patent application claims priority to and incorporates by reference the corresponding provisional patent application Ser. No. 61/089,098, titled, "Channel Classification and Rate Adaptation for SU-MIMO Systems," filed on Aug. 15, 2008.

FIELD OF THE INVENTION

Embodiments of the present invention relate to the field of channel classification and rate adaptation schemes for single-user (SU)-MIMO systems; more particularly, embodiments of the present invention relate to the case where the mobile receives (by use of one or several antennas) coded representations of a signal sent over multiple transmit antennas, and where the transmit antennas may be distributed over multiple base stations (i.e., they are not collocated).

BACKGROUND OF THE INVENTION

Future wireless systems require a more effective utilization of the radio frequency spectrum in order to increase the data rate achievable within a given transmission bandwidth. This can be accomplished by employing multiple transmit and receive antennas combined with signal processing. A number of recently developed techniques and emerging standards are based on employing multiple antennas at a base station and the mobile. Some of these can be used to improve the reliability of data communication over wireless media without compromising the effective data rate of the wireless systems. So called space-time codes (STCs) are used to this end. Some are used to increase the data rate of the wireless system. Systems such as Bit Interleaved Coded Modulation (BICM) in a Multiple Input Multiple Output (MIMO) scenario have been used for this purpose. Furthermore, recent advances in wireless communications have demonstrated that by jointly encoding symbols over time and transmit antennas at a base station one can obtain reliability (diversity) benefits as well as increases in the effective data rate from the base station to each cellular user. BICM, or BICM combined with STCs, provide such tradeoffs.

The multiplexing gains and diversity benefits are also inherently dependent on the number of transmit and receive antennas in the system being deployed, in the sense that they are fundamentally limited by the multiplexing-diversity trade-offs curves that are dictated by the number of transmit and the number of receive antennas in the system.

When a group of transmit antennas are used to send a single transmission containing information for a single user to a single receiver, which may also have multiple receive antennas, the resulting class of systems is typically referred to as single-user (SU)-MIMO systems.

A number of systems have been proposed for SU-MIMO-based transmission. Most state-of-the-art schemes rely on providing high data rates via wideband transmission that relies on the use of OFDM, since OFDM makes an equalizer unnecessary. With multilevel modems, coded modulation systems can easily be designed by use of an outer binary convolutional code and an interleaver in a BICM system. Most state-of-the art systems employ coded OFDM/MIMO-based transmission of this (or similar of a) form, whereby each groups of time/frequency slots are mapped into resource blocks and multiple users compete for scheduling in each resource block. In general, once a user is scheduled, coding occurs, often using an outer binary code with rate $R_c$, followed by an interleaver and a mapper that maps groups of bits to complex valued symbols, adhering to, e.g. a Quadrature Amplitute Modulation (QAM) constellation of size Q. These symbols are passed in round robin fashion to the antennas for OFDM transmission over the appropriate resource block. Typically, the users are scheduled for transmission by looking at a channel quality level indicator (CQI), such as their nominal received signal level. Although such aggregate CQI values can prove accurate indicators of the achievable rates in single-input single-output (SISO) transmission, they are a lot less meaningful for MIMO transmission. Indeed, two different MIMO channels with the same CQI level could support drastically different rates.

In many of the existing and emerging wireless system standards supporting SU-MIMO, within any "resource block channel," a scheduler and/or rate adaptation mechanism decides which receiver (user) to serve and chooses a rate to transmit to this user. The rate is selected from one a number of possible transmission rates often based on scheduling criteria and/or a user's channel state between the transmitter and receiver. A rate is supported by a single transmission mode, each of which could be implemented by a specific STC, or BICM system with a given outer code rate and constellation, or combination. Given the scheduler's decision, point-to-point SU-MIMO transmission supporting this rate is then used from the transmitter to that receiver.

It is important to note that a given transmission rate (mode) can be supported at the receiver equipment by a number of possible different receiver algorithm designs. However, existing scheduler and/or rate adaptation mechanisms do not consider the particular receiver algorithm implementation or design, or the fact that receiver equipment may have more than one design at its disposal for a given rate (mode).

It is well known that SU-MIMO schemes work well at high rates for rich scattering channels, i.e., for channels where several parallel streams are created using multiple transmit antennas. On the other hand, with a channel with very strong direct paths but limited scattering, a much lower rate can be typically supported. It is therefore important that the system rate is well matched to the channel's ability to support a certain rate. If not, an outage event will inevitably occur, if too high transmission rate is attempted over the channel.

Here it is important to note a given transmission rate can be supported by a number of different transmission options, e.g. different BICM and/or STC combinations can result in the same transmission rate. These can behave differently depending on the channel and receiver algorithm being used.

SUMMARY OF THE INVENTION

A method, apparatus and system are disclosed herein for channel classification and adaptation. In one embodiment, the system comprises a base station having a transmitter that is operable to transmit wireless signals using a plurality of transmission options; and a user terminal having a receiver that is operable to receive and decode wireless signals using a plurality of receiver algorithms, where the user terminal is operable to receive communications from the transmitter over a multiple-input, multiple output (MIMO) channel, to select at least one coding mode to be used by the transmitter on the channel based on rates achievable using MIMO transmission, in view of the channel information, using different combinations of one of the plurality of receiver algorithms and one of the plurality of transmission options, and to send information to identify the at least one coding mode to the base station using a feedback channel, each coding mode specifying at least an encoder to be used by the transmitter for the channel.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
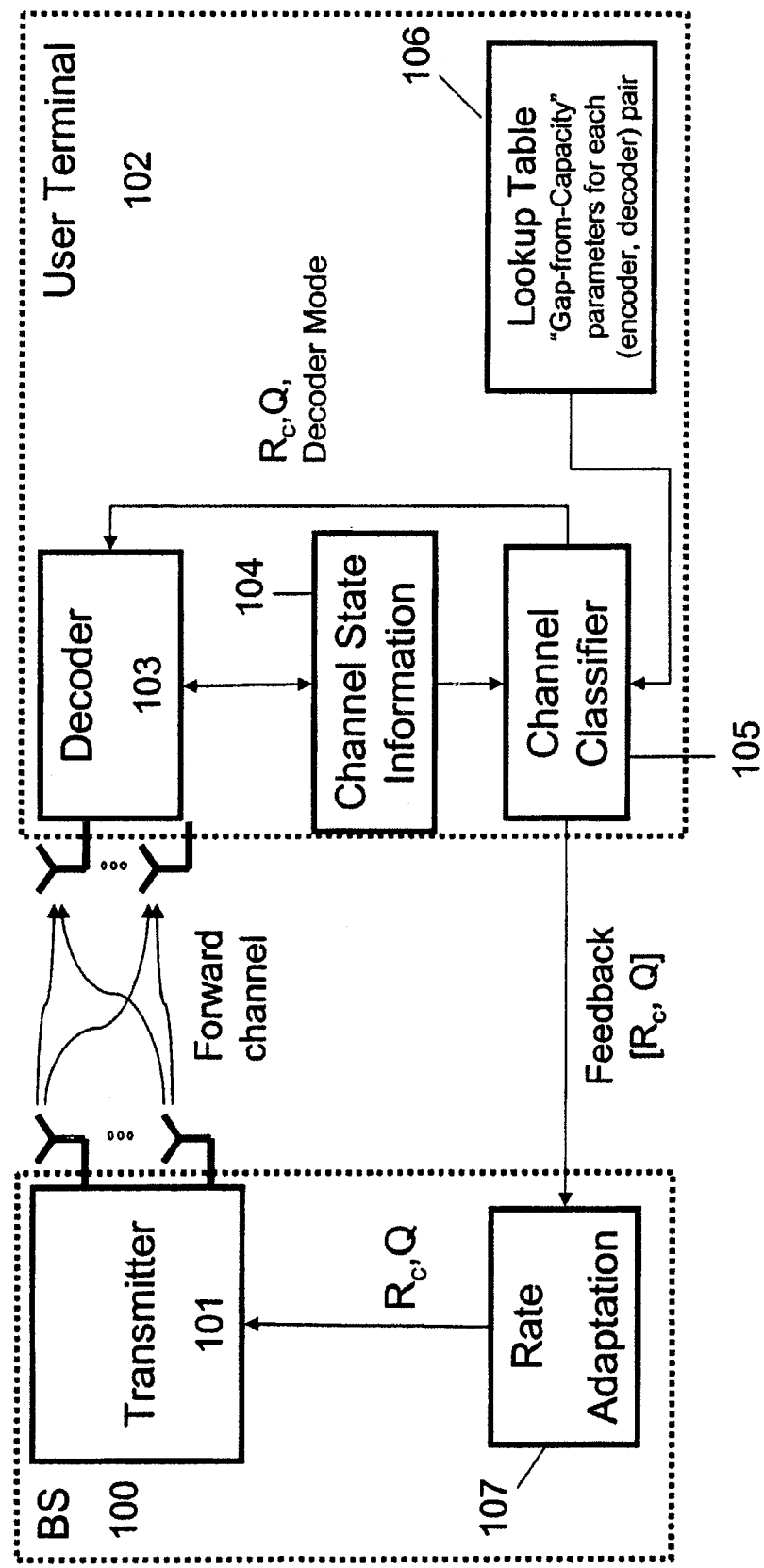
FIG. 1A is a system block diagram of one embodiment of a base station and a user terminal that uses channel classification and rate adaptation functions described herein.

A method and apparatus for selecting coding modes for use in wireless communications systems, based on channel classification, are described. In all embodiments the decision on coding mode, or decision on a number of possible candidate coding modes, is done at the receiver based on criteria that depend on the design and types of receiver algorithms present in the receiving equipment and other considerations at the receiver, such as, e.g., available battery power. The transmitter does not make such decisions and does not need to know the receiver algorithms present. For purposed herein, encoding (or coding) mode is understood in this invention to mean potentially variable aspects of the transmission method, including (and not limited to) outer code type, memory, rate, modem type and size, mapper, and number of transmitted streams from the transmitter antennas.

In one embodiment, the decision at the receiving equipment classification is directly linked to the rates that could be achievable via SU-MIMO transmission for each of a given number of specific transmission options. Such a determination of rate is specific to the transmission option. Furthermore, such a determination of rate is specific to the receiver algorithm, or algorithms, that may be used in combination with a given transmission option. As a result, both the rate and the coding scheme(s) that can be supported can be a priori estimated at the receiver (within the receiver equipment) given knowledge of the channel and knowing the transmission options and specifics of the receiver algorithms present in the receiving equipment. The transmitter does not need to know information such as the CQI index (described above) directly. The transmitter does not need to know information such as the receiver algorithms present in the receiving equipment.

In one embodiment, the SU-MIMO channel state information is established at the receiver based on pilot tones in the OFDM system. Based on these measurements, a determination of the rate supported by the channel for each transmission coding mode and each available receiver decoding algorithm (there can be multiple decoding algorithms for each transmission mode) is performed by a classifier in a receiver. Based on the classification outcome of the classifier, a coding mode is selected by the receiver. This also defines the effective rate to be used during forward link transmission from the transmitter to the receiver.

In one embodiment, only the coding mode is fed back to the transmitter.

In other embodiments multiple candidate coding modes are fed back to the transmitter. In these cases, the transmitter selects (out of these candidate coding modes) the coding mode for communication and communicates this choice to the receiver.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of the invention apply primarily to (although they are not limited to) the forward link (i.e., base station-to-mobile) transmission in wireless environments, where multiple transmit antennas are used to wirelessly communicate information to receivers, which also have (typically) multiple receive antennas. In one embodiment, the forward link transmissions are performed using a class of multiple-input multiple-output (MIMO) schemes referred to as single-user MIMO (SU-MIMO) schemes.

Embodiments of the invention use a decision algorithm at the receiver in order to choose and feed back to the transmitter the coding parameters that are to be used by the transmitter for communicating to the receiver. In one embodiment, techniques are disclosed for choosing the coding parameters from a family of coding modes, including the modulation format the type of the outer code and its coding rate, via a suitably designed channel-based code-classification algorithm at the receiver.

Existing and emerging SU-MIMO OFDM systems for wireless environments dedicate certain tones to pilots, i.e., to sending probing signals (known to the receivers) in order for the receivers to obtain channel state information. According to one embodiment, based on these measurements of these probing signals, the receiver (with certain intervals) calculates a channel classification. In one embodiment, this classification is based on a metric that depends on the mutual-information (e.g., an estimate or an accurate lower or upper bound on mutual information) between the input and the output for the given channel, and assuming a given modem for transmission. The mutual information estimate can establish the channel quality and the ability of the channel to support a certain data rate with the given modem.

The system can operate at several coding modes. Each such coding mode corresponds to a choice of coding parameters such as, for example, the size (and potentially type) of the modulation format, the type of the outer code and its rate. In one embodiment, the receiver performs a classification based on rates achievable using MIMO transmission on the channel, in view of the channel information (e.g., a mutual information estimate), for various combinations of receiver algorithms and transmission modes. That is, the receiver determines the rates for different combinations of one of the receiver algorithms available to the receiver and one of the transmission options (modes) available to the transmitter. Based on the calculated rates, the receiver chooses a coding mode to be employed by the transmitter.

In one embodiment, using the mutual information estimate together with a (precomputed) "gap from capacity" for any such given coding mode/decoding mode combination, the classification made by the receiver determines whether or not low-frame error communication is feasible for the given mode on the given channel. Among all the feasible coding modes, one (e.g., the one yielding the highest rate) is selected for communication at the receiver.

The parameters associated with that coding mode are communicated back to the transmitter wirelessly via a feedback channel. Then, the appropriate transmission mode (including the transmission rate) is set, and the transmitter and the receiver simultaneously adapt to this mode until the next channel measurements and changes in the channel classification take place. At that time, changes may occur in the encoder (at the transmitter) and/or the decoder (at the receiver), as required by the newly selected encoder/decoder adaptation parameters.

In one embodiment, to facilitate the adaptation, the building blocks in a space-time coding system consist of OFDM for wideband transmission, MIMO and large QAM constellations for high spectral efficiency, a bit-interleaver for the bit interleaved coded modulation scheme (BICM) and a family of outer binary codes. For various coding modes, the binary outer code could for example be a turbo code, a regular convolutional code, an RCPC code, an LDPC code, or any particular type of outer code. This family of SU-MIMO systems is well suited for resource efficient transceiver-adaptive systems, and allow a wide range of finely-spaced rate options that can be achieved by changing the constellation size and/or the rate of the outer binary code and the number of distinct OFDM streams that are transmitted by the transmit antennas.

In general, there may be multiple available receiver structures per coding mode with different performance complexity trade-offs. The classifier may choose the operating mode taking into account the performance/complexity trade-offs of the receiver structures associated with different coding modes in view of information regarding the channel state.

FIG. 1A is a simplified block diagram of a communication system only showing one example of a base station 100 with a transmitter and one user terminal 102. The user terminal receives communications from the transmitter over a forward link MIMO channel, selects a coding mode to be used by the transmitter and the receiver for communications on the channel from the transmitter to the receiver, and sends information to identify the coding mode to the base station using a feedback channel. In one embodiment, the coding mode specifies an encoder to be used by the transmitter for the channel and a decoder to used by the receiver. Thus, the rate/code selection/adaptation method based on channel classification occurs at the receiver and pertinent coding parameters are fed back to the transmitter. It would be apparent to one skilled in the art that a communication system would have any number of base stations and any number of user terminals.

Referring to FIG. 1A, user terminal 102 includes a channel state information unit 104 that obtains channel state information based on estimating the channel. In one embodiment, the receiver channel-state information is based on pilot symbols inserted in the OFDM system at the transmitter 110. User terminal 102 also includes channel classifier unit 105 (which are not explicitly shown in FIG. 3), which indirectly estimates the supportable rate for this particular channel (by selecting the encoding mode, e.g., outer code rate, modem, mapper, number of streams transmitted, and the decoding mode). In one embodiment, this can be done for the entire OFDM system. In another embodiment, this is done for individual tones or for sub-bands. For the case of sub-bands, an outer code, interleaver and modem unit is required for each band as well as a matching receiver.

In one embodiment, the user terminal selects the one pair based on classification of the channel. In one embodiment, the classification is calculated from channel state information. In one embodiment, the user terminal calculates a channel classification via a metric that depends on channel mutual information and the modem. Based on the classification, the classifier unit 105 of user terminal 102 determines which encoder and decoder pairs to use with communications on the channel between the transmitter and the receiver and to select one of the pairs as the coding mode. Classifier unit 105 determines the rates for different combinations of one specific encoding mode (outer-code w/ its type memory and rate, mapper, modem, number of transmitted OFDM streams) and the one or more decoding modes specific to that encoding mode, and based on the calculated rates, classifier unit 105 chooses a coding mode to be employed by the transmitter and the associated decoding mode to be used at the receiver.

In one embodiment, the user terminal selects the one pair based on receiver criteria. In one embodiment, the user terminal selects the one pair based on QoS constraints. In one embodiment, the user terminal selects the one pair because the encoder and decoder pair supports the highest possible rate with a given QoS criterion and given receiver constraints in comparison to one or more other encoder and decoder pairs.

In one embodiment, the user terminal determines the pairs based on whether the pairs are feasible for transmission on the channel and selects the one pair. The selection of the one pair out of the set comprising all feasible pairs for transmission may be performed based on a number of different criteria. In one embodiment, if the selection is based on rate, a subset (smaller set) is created from the set by keeping only the modes that correspond to encoding modes that achieve the highest overall transmission rate (by default, all these encoding/decoding pairs in this set would have to have encoding modes with the same overall transmission rate). If only one pair is in the set, then this pair is the chosen pair; if there are multiple pairs, then the one pair is chosen as the pair with the lowest receiver complexity. In one embodiment, the selection is based on whether a rate of the code does not exceed the mutual information of the channel minus a pre-calculated gap that is specific to the pair and to the receiver.

Based on the classification, a pre-computed pair of signal constellation size and outer code rate and/or type is then communicated to base station 100 to control transmitter 101 via adaptation unit 107 (e.g., for rate adaptation). Decoder 103 of user terminal 102 and transmitter 101 are synchronized using the identical signal constellation and outer code rate information over a certain subband or tone and time interval.

In order to illustrate how one embodiment of the channel-classification rate-adaptation algorithm operates, consider the case of transmitting to a user over a single OFDM tone (or, equivalently, a resource block within the coherence bandwidth of the channel). Assuming there are $N_t$ transmit antennas and $N_r$ receive antennas the received signal over the given OFDM tone is of the form $$y(n) = \sqrt{\frac{\rho}{N_t}} Hx(n) + w(n)$$

where H denotes the $N_r \times N_t$ channel matrix (on the given OFDM tone), x(n) denotes the $N_t \times 1$ vector of coded signal transmitted by the $N_t$ transmit antennas (the ith element of x(n) denotes the sample transmitted over the nth use of the channel), $\rho$ denotes the signal to noise ratio, and y(n) and w(n) denote a (possibly scaled) version of the associated $N_r \times 1$ received and noise vector signals respectively. The samples of the input (transmitted) coded signal x(n) take on values in the discrete set X, where X is a constellation of points on the complex plane. For instance, X can denote a set of QAM constellation symbols, with Q points in the constellation. It is also assumed that the transmission scheme can operate at many different coding modes. In one embodiment, each mode corresponds to a particular choice of X (e.g., if it is a QAM constellation, a particular choice of Q), in conjunction with an outer code (e.g., a convolutional code, block code, or LDPC code), and a particular choice of an outer-code rate, $R_c$. In one embodiment, the overall transmission rate, R, of any such mode is equal to the product of $R_c$ and the base-2 logarithm of Q (i.e., $\log_2 Q$). The coding modes (the family of outer codes, e.g., a family of punctured convolutional codes, or a family of LDPCs, or turbo codes, and the possible constellations) are given and known to the transmitter and the receiver.

In one embodiment, pilots are used at the receiver to estimate the channel H, and the resulting channel estimate of H is passed as input to channel classifier 602. In one embodiment, the channel classification method of channel classifier 602 employs as its metric for selecting the transmission rate, R, along with the actual transmitter-operating mode ($R_c$, Q), the following conditional mutual information quantity:

$$I_H = I_H(x, y) = E\left[\log_2 \frac{p(y \mid x, H)}{p(y \mid H)} \mid H\right].$$

In a closed-loop rate-adaptive scheme, the receiver measures H from the downlink pilots, computes $I_H$ for all constellations in the family, and then it requests the coding scheme that achieves the maximum rate not below the above mutual information, decreased by some suitable rate gap that depends on the family of codes and the family of receivers being considered. The gap value for each combination of the codes being considered and each available decoder choice for that encoder is pre-calculated offline.

In one embodiment, this classification operation is repeated at each frame. Also, in one embodiment, the feedback operation is employed after each frame, after a preset number of frames, or in an adaptive fashion, e.g., whenever there is a "significant" change in the output of the classifier.

In one embodiment, the mutual information between the channel input and output (see formula two paragraphs above) is also used for channel classification, but it is considered simpler to calculate an estimate, which is advantageous when keeping the complexity of the mobile terminal as low as possible is desirable. A number of methods can be used for obtaining accurate estimates of the $I_H$ quantities at the receiver with low computational overhead. In one embodiment, an upper bound is used as an estimate of the metric. One such upper bound is given as the minimum of two quantities: (i) the product of the base-2 logarithm of the size of the constellation (i.e., Q) and the minimum of $N_t$ and $N_r$; (ii) the base-2 logarithm of the determinant of the matrix $I+(\rho/N_t)$ H $H^H$, where I is the identity matrix, and $H^H$ denotes the transpose conjugate of H. Similarly, the tightness of the upper bound estimate can be verified by computing similarly obtained lower bounds to $I_H$. Approximate versions of such lower bounds can be obtained in a very computationally efficient way. One example involves using the well-known chain rule of mutual information in order to express the mutual information between the vector input stream x and the vector output stream y over the given channel realization H, as the sum of mutual-information terms, whereby the ith term denotes the mutual information between the scalar input stream $x_i$ and the output vector y, assuming symbols $x_1$, $x_2, \ldots, x_{i-1}$ are known at the receiver. (Note that the ordering of the symbol streams need not correspond to the actual ordering of the antennas, and could be used in principle to improve the tightness of the bound). Each such mutual information component term between a scalar $x_i$ and the observed vector can be lower bounded by the mutual information between the scalar $x_i$ and a scalar observation, denoting the linear mean-square estimate of $x_i$ based on the observed vector y and assuming symbols $x_1, x_2, \ldots, x_{i-1}$ are known. These lower-bounding quantities can be approximated very efficiently by use of table lookup and interpolation using well-known mutual information tables between scalar inputs (constrained to comply with the encoder modem restrictions) and scalar outputs.

In one embodiment, the rate-code selection algorithm at the receiver obtains a mutual information metric $I_H$ and tests each individual code (or coding mode) independently to determine whether or not the code is "feasible" on the given channel, where a code is feasible if the rate of the code does not exceed the mutual information of the channel minus a pre-calculated gap that is specific to that coding mode and to the decoder structure employed. In one embodiment, these "gap from capacity" numbers are pre-calculated a priori for each combination of coding mode ($R_c$, Q) and, potentially, for each receiver structure and stored in a look-up table (see FIG. 1A). Then, once the feasible coding modes are calculated, the classifier identifies the set of feasible modes with the highest overall transmission rate, chooses one of those modes (e.g., the one with the least receiver complexity), and feeds it back to the transmitter.

For the case of multi-band classification, there is also a scheduler in the system operating based on this information. In one embodiment, the transmitter (e.g., base station) also employs the feedback parameters to schedule the users according to their rate (or coding scheme) requests, depending on any suitable downlink-scheduling algorithm. In one embodiment, the base station implements proportional fair scheduling (PFS) based on the user-rate feedback messages.

In another embodiment, groups of tones are scheduled (or considered for scheduling) per user (in an extreme case all the tones can be considered for a single user). In one embodiment, many different classifiers are used, one for each channel matrix, and the rate-code adaptation method is run independently on each such channel, based on the result of the associated channel classification. This results in providing distinct coding modes on different subsets of tones allocated to that user. In another embodiment, a common coding mode is chosen for transmission over the whole group of tones allocated to a specific user. This common coding mode can be estimated at the receiver and fed back to the transmitter. In an alternative embodiment, the individual coding rates on different tones are fed back to the transmitter, and the transmitter then selects a common coding rate for (potentially only a subset of) all the bands. In yet another embodiment, one or more "common" coding modes are chosen across all the tones in the system and the feedback information from each user is used by the scheduling algorithm to select users complying with a particular common operating mode.

Figure 1B:
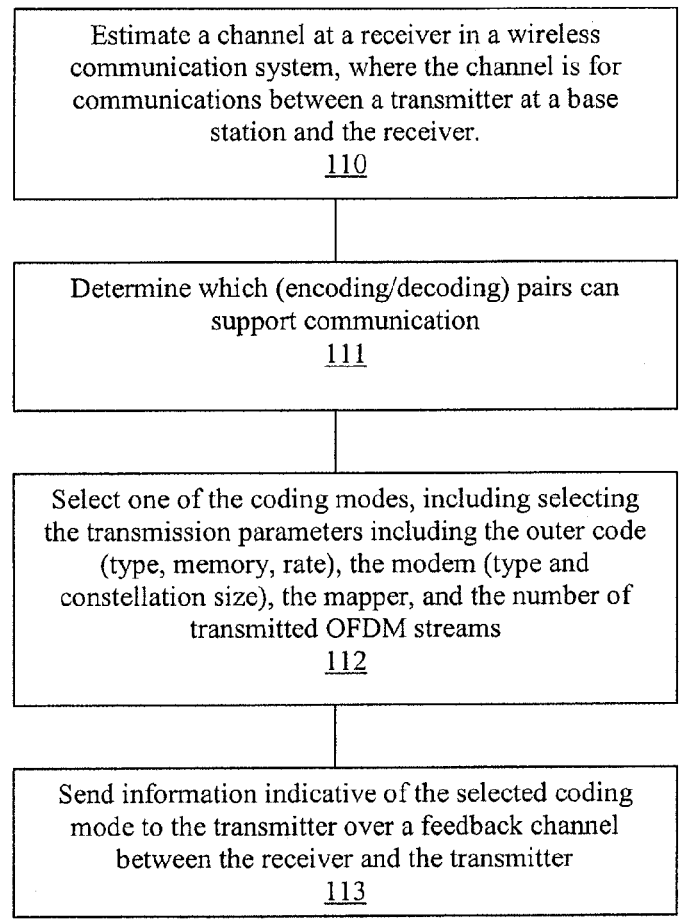
FIG. 1B is a flow diagram of one embodiment of a process for performing channel classification.

FIG. 1B is a flow diagram of one embodiment of a process for performing channel classification. The process is performed by processing logic that may comprise hardware (e.g., dedicated logic, circuitry, etc.), software (such as is run on a general purpose computer system or a dedicated machine), or a combination of both.

The process begins by processing logic estimating a channel at a receiver in a wireless communication system, where the channel is for communications between a transmitter at a base station and the receiver (processing block 110). In one embodiment, the channel is estimated using pilots.

Next, processing logic of the receiver determines which coding modes can support communication over the channel between a transmitter and the receiver at a target performance level (processing block 111). In one embodiment, each coding mode specifies at least an encoder to be used by a transmitter on the channel.

From these coding modes, processing logic at the receiver selects at least one of the coding modes (processing block 112), including, in one embodiment, selecting the transmission parameters including one or more of the outer code (type, memory, rate), the modem (type and constellation size), the mapper, and the number of transmitter OFDM streams. Note that selection of the coding modes may dictate selection of the transmission rate, outer code rate, and constellation size. In an alternative embodiment, processing logic in the receiver selects multiple possible coding modes for use by the transmitter and sends information to inform the transmitter of this group of coding modes. In response, the transmitter selects one coding mode from this group of coding modes to use and communicates it to the receiver.

Thereafter, processing logic sends information indicative of the selected coding mode to the transmitter over a feedback channel between the receiver and the transmitter (processing block 113).

Example Embodiments of Wireless Communication Systems

A wireless communication system comprising a first device (e.g., a base station) having a transmitter and a second device having a receiver (e.g., a user terminal) to receive information-bearing signals from the transmitter wirelessly transmitted using OFDM and bit interleaved coded modulation is described. In one embodiment, the communication system described herein is a coded modulation system that includes transmitters that apply space-time coding with bit-interleaved coded modulation that is combined with a multi-carrier OFDM modulation and receivers that apply OFDM demodulation with iterative demapping and decoding. The systems described herein have $N_t$ transmit antennas and $N_r$ receive antennas. Each of the $N_r$ receive antennas receives signals that are the sum of channel-distorted versions of the signals transmitted from (all or a subset of) the $N_t$ transmit antennas. Such coded modulation systems in accordance with the present invention may be advantageously employed in wireless local/wide area network (LAN/WAN) applications.

In one embodiment, the space-time coding system described herein comprises OFDM for wideband transmission, MIMO and large QAM constellations for high spectral efficiency, a bit interleaver for the bit-interleaved coded modulation scheme (BICM) and an outer binary code. The overall detection is typically performed iteratively (but this is not required). If it does, both the inner MIMO demapper and the outer decoder perform soft in soft out (SISO) detection/decoding. In one embodiment, the MIMO detector in principle works with a set of binary outer codes. These codes include a turbo code, a punctured convolutional code, an RCPC code, an LDPC code or other block code, or a combination of such codes. The decoder for the outer code is also selected from a set of outer codes. In one embodiment, the outer code decoder is a SISO type decoder (e.g., a MAP decoder), where the outer decoder supplies soft information to the inner MIMO detector for iterative decoding.

Transmitter and Receiver Embodiments

Figure 2:
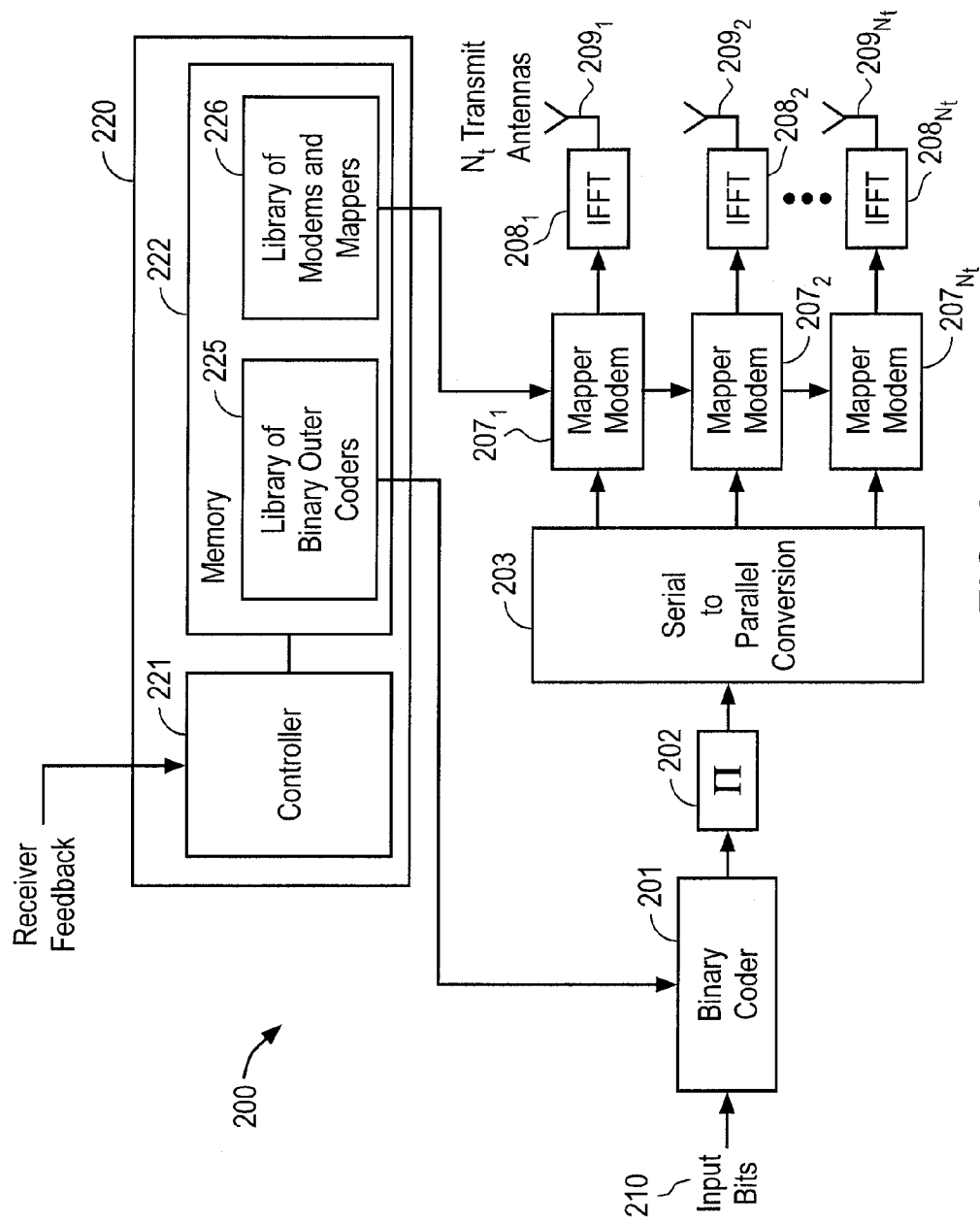
FIG. 2 is a block diagram of one embodiment of a transmitter for a MIMO/OFDM system with BICM.
Figure 3:
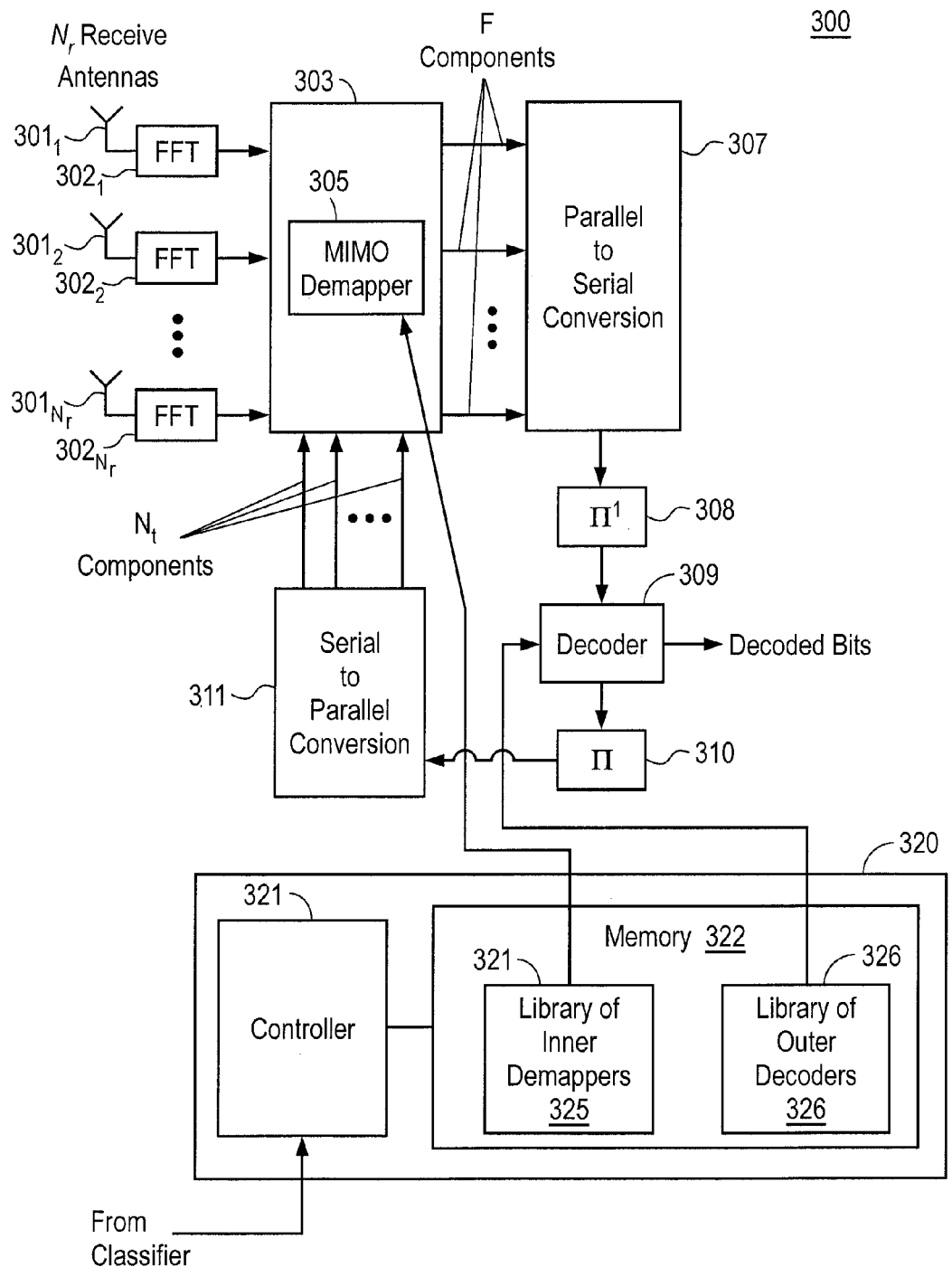
FIG. 3 is a block diagram of one embodiment of a receiver for a MIMO/OFDM system with BICM/ID.

FIGS. 2 and 3 show the transmitter and receiver block diagrams for a MIMO/OFDM system with BICM and iterative decoding (ID). More specifically, FIG. 2 is a block diagram of one embodiment of a transmitter for space-time coding with bit-interleaved coded modulation (BICM) with OFDM modulation for wideband frequency selective channels. Referring to FIG. 2, transmitter 200 comprises (as an example) binary encoder 201, bit interleaver 202, serial-to-parallel converter 203, mapper modems $207_1$-$207_{Nt}$, inverse fast Fourier transform (IFFT) modules $208_1$-$208_{Nt}$, and transmit antennas $209_1$-$209_{Nt}$. Note that IFFT modules $208_1$-$208_{Nt}$ also include circular-prefix operations, which are performed in a manner that is well known in the art. Also the resulting sequences generated by the IFFT/circular prefix modules are converted into electrical continuous-time signals via pulse-amplitude modulation in a manner that is well known in the art.

To perform BICM encoding to the data, binary coder 201 applies a binary convolutional code to the input bits (input data) 210. Bit interleaver 202 then interleaves the encoded bits from convolutional coder 201 to generate bit-interleaved encoded bits. This bit interleaving de-correlates the fading channel, maximizes diversity, removes correlation in the sequence of convolutionally encoded bits from convolutional coder 201, and conditions the data for increased performance of iterative decoding. Convolutional coder 201 and bit interleaver 202 may typically operate on distinct blocks of input data, such as data packets.

After performing bit interleaving, bit-mapping and modulation and OFDM are applied to the bit-interleaved encoded bits. Serial-to-parallel converter 203 receives the serial bit-interleaved encoded bit stream from bit interleaver 202. Note that serial-to-parallel converter 203 may include a framing module (not shown) to insert framing information into the bit stream, which allows a receiver to synchronize its decoding on distinct blocks of information. Serial-to-parallel converter 203 generates a word of length $N_t$ long, with each element of the word provided to a corresponding one of mapper modems $207_1$-$207_{Nt}$. Elements of the word may be single bit values, or may be B bit values where B is the number of bits represented by each modem constellation symbol.

Figures 4, 5:
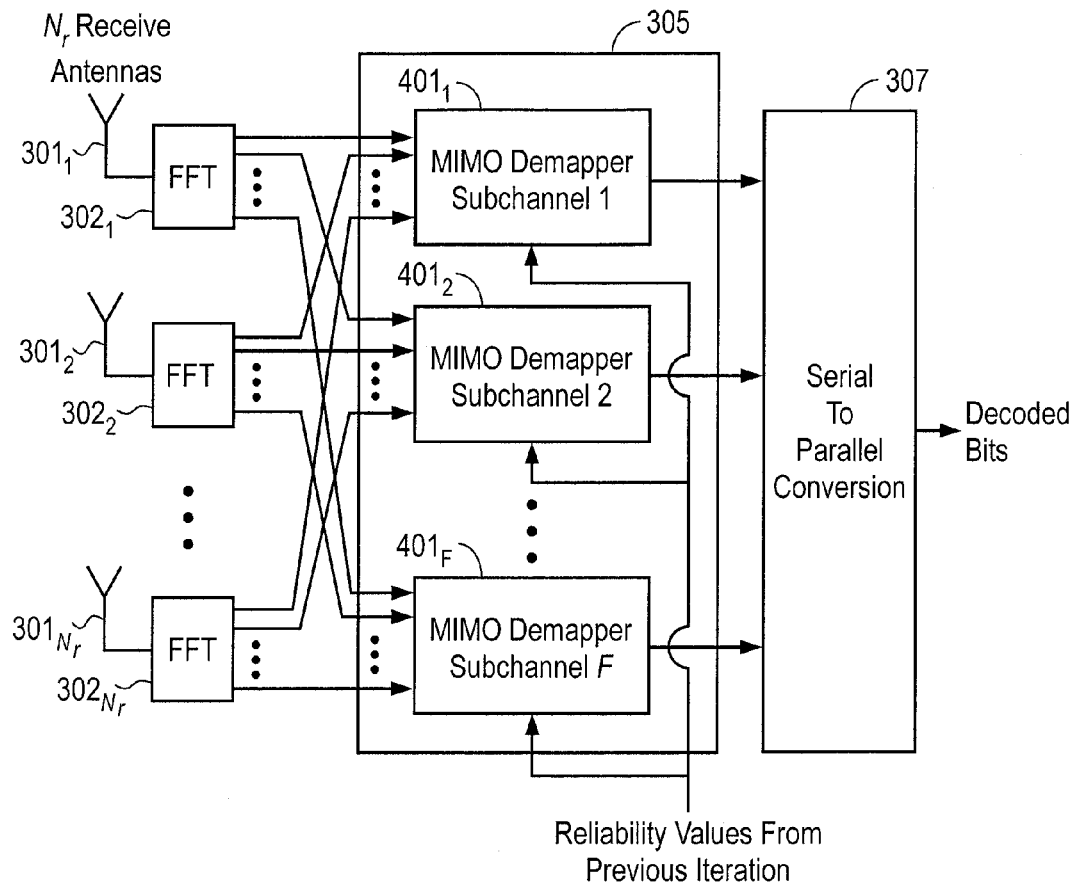
FIG. 4 is a block diagram of one embodiment of a receiver for different SOMA detectors for different OFDM tones for the MIMO/OFDM system with BICM and iterative decoding (ID).
FIG. 5 illustrates a set partition type mapper for 16 QAM.

Each of mapper modems $207_1$-$207_{Nt}$ converts B bits to corresponding symbols (of the Q-ary symbol space, with $Q=2^B$). The output of each modem mapper 207 is a complex-valued symbol (or equivalently two real-valued samples, representing the real and imaginary parts of the complex-valued symbol). Each of IFFT modules $208_1$-$208_{Nt}$ collects up to F symbols, and then applies the IFFT operation of length F to the block of F symbols. F is an integer whose value can typically range from 64 to 4096, or larger and depends on the available transmission bandwidth, the carrier frequency, and the amount of Doppler shifts that need to be accommodated by the system. Thus, each of IFFT modules $208_1$-$208_{Nt}$ generates F parallel subchannels that may be transmitted over the corresponding antenna among $209_1$-$209_{Nt}$. Each subchannel is a modulated subcarrier that is transmitted over the channel. In one embodiment, the transmitter and receivers have an equal number of transmit and receive antennas, i.e., $N_t=N_r=N$. The binary information-bearing signal, hereby denoted as $u_k$, is encoded first at the transmitter by an outer binary code using convolutional coder 201, generating a coded sequence $c_k$. This sequence is interleaved by a bit interleaver 202. Then, each of mapper modems $207_1$-$207_{Nt}$ maps groups of B interleaved bits at a time into $2^B$-QAM symbols. The resulting QAM symbols are multiplexed through the N transmit antennas $209_1$-$209_{Nt}$ in a round-robin fashion and OFDM transmission is applied over each antenna using IFFT modules $208_1$-$208_{Nt}$. FIG. 5 shows a representative mappings for B=4, referred to as a set partition type mapper for 16 QAM for use in iterative decoding. This type of mapper is sometimes suitable for BICM with iterative decoding (ID). Other mappers such as the well known Gray Mappers may also be used.

An adaptation unit 220 having a controller 221 and a memory 222 are communicably coupled to binary coder 201 and mapper modes 207, -$207_{Nt}$. Memory 222 stores a library of binary outer coders 225 and a library of mappers and modems 226 that the transmitter may use. In one embodiment, the set of mappers and modems comprises one or more of Gray mappers with BPSK, QPSK, 16-QAM, 64-QAM, 256-QAM, 1024-QAM, and 8-PSK, and set partition mappers for 16-QAM, 64-QAM, 256-QAM, 1024-QAM, and 8-PSK. The specific configuration of mappers, modems and outer codes is implemented with a hardware or software switch in the transmitter, in a manner well-known in the art.

In response to the feedback from the receiver, controller 221 causes a binary coder and a mapper modem to be loaded into binary coders 201 and mapper modems $207_1$-$207_{Nt}$. Note that memory 222 may be external to the base station and/or the adaptation unit.

FIG. 3 is a block diagram of one embodiment of a receiver having an iterative decoder for the space-time code for the OFDM system. Referring to FIG. 3, receiver 300 comprises receive antennas $301_1$-$301_{Nr}$, fast Fourier transform (FFT) modules $302_1$-$302_{Nr}$, demodulator/detector 303, parallel-to-serial converter 307, bit deinterleaver 308, decoder 309, bit interleaver 310, and serial-to-parallel converter 311. Although not shown, each of the FFT modules $302_1$-$302_{Nr}$ is preceded by front end that performs filtering, sampling, and a circular-prefix-removal operation.

For a wideband system, receiver 300 performs OFDM demodulation for each of receive antennas $301_{1-Nr}$, and the demodulation and demapping is performed over F parallel subchannels. The ith receive antenna $301(i)$ senses a signal made up of various contributions of the signals transmitted from the $N_t$ transmit antennas (i.e., contributions of the multiple F parallel, narrowband, flat fading subchannels transmitted over corresponding antennas $209_1$-$209_{Nt}$ of FIG. 2). Each of FFT modules $302_1$-$302_{Nr}$ apply an F-point FFT to the corresponding signals of receive antennas $301_1$-$301_{Nr}$, generating $N_r$ parallel sets of F subchannels.

In one embodiment, demodulator/detector 303 estimates bits in each of the F subchannels along with reliability (soft-output) information on each of these bit estimates. Multi-input multi-output (MIMO) demapper 305, based on the $N_r$ parallel sets of F subchannels from FFT modules $302_1$-$302_{Nr}$ produces soft estimates of the demapped bits (i.e., bits mapped from the constellation symbol) in each of the F subchannels from the $N_t$ antennas in the transmitter. In one embodiment, in one coding mode, MIMO demapper 305 produces the estimates of the demapped bits and reliability information about these bits using reliability information generated by soft-output decoding (followed by reinterleaving) by decoder 309, which acts as a MAP decoder.

In one embodiment, MIMO demapper 305 computes hard values (i.e., 0/1 estimates) for the bits transmitted on the overlapping F subchannels, along with an estimate (approximation) of the a posteriori probability of the hard value being correct. FIG. 4 is a block diagram of one embodiment of MIMO demapper 305 having MIMO joint demapper units for the different OFDM tones/subchannels. Referring to FIG. 4, each signal of the $N_r$ receive antennas $301_1$-$301_{N_r}$ is divided into F subchannels (via demodulator 304, not shown in FIG. 4) by applying an FFT operation and sending its output to corresponding subchannel MIMO demappers $401_1$-$401_F$. The signal outputs of the kth subchannel for all $N_r$ receive antennas are provided to the kth subchannel MIMO demapper 401(k). After the first iteration reliability information is provided to the kth subchannel MIMO demapper 401(k), using extrinsic information generated by the output of decoder 309 at the previous iteration. In one embodiment, in one coding mode, the extrinsic information is exchanged between MIMO demapper 305 and decoder 309 to improve the bit error rate performance at each iteration. Methods for computing the extrinsic information in such inner/outer decoder settings are well-known in the art. In the first iteration, there is no extrinsic information input to the soft demapper. In subsequent iterations, in one embodiment, the extrinsic information is computed as follows. First, the soft-output is computed by the MAP outer decoder, and from it the input reliability information (input to the same outer decoder) is subtracted off in order to compute the extrinsic information produced by decoder 309. In one embodiment, the MAP decoding process generates soft output values for the transmitted information bits in a manner that is well known in the art. This extrinsic information is deinterleaved and passed as input to MIMO demapper 305 in the next iteration.

Returning to FIG. 3, the estimates of bits in F parallel streams from MIMO demapper 305 together with reliability values for those bits are provided to parallel-to-serial converter 307 along with the extrinsic reliability information on each one of these bits. The reliability information is computed as the difference between the output reliability values for those bits (produced by demapper 305) and the input reliability values for those bits (inputs to demapper 305). The converter 307 reconstitutes the estimate of the BICM encoded bit stream generated by the transmitter, which was estimated by the receiver 300. The estimated BICM encoded bit stream (and the extrinsic reliability information) is then deinterleaved by bit deinterleaver 308 and applied to decoder 309 to reverse the convolutional encoding applied by the transmitter. The reverse operation in this case corresponds to generating estimates of the bit values of the information bit stream that is the input to binary coder 201, and also producing extrinsic information that is to be passed back (after reinterleaving) to MIMO demapper 303 as new reliability information.

The extrinsic information from decoder 309 is first applied to bit interleaver 310. Bit interleaving aligns elements of the extrinsic information with the interleaved estimated BICM encoded bitstream from MIMO demapper 305. In addition, the interleaved extrinsic information is applied to serial-to-parallel converter 311, which forms $N_t$ parallel streams of extrinsic information corresponding to the parallel bit streams formed at the transmitter.

The extrinsic information is exchanged between MIMO joint demapper 305 and decoder 309 to improve the bit error rate performance at each iteration.

The receiver also includes an adaptation unit 320 that includes a controller 321 and a memory 322, which stores libraries of inner demappers and outer decoders that may be selected by the receiver as coding modes. In one embodiment, the library of inner demappers comprises a non-iterative MMSE demapper, an iterative MMSE demapper, a non-iterative SOMA-based demapper with an MMSE front-end, an iterative SOMA-based demapper with an MMSE front-end, a MAP demapper, a MaxLogMAP demapper, and soft-output spherical decoders. In one embodiment, the library of outer decoders comprises at least two of a Viterbi decoder, a MAP decoder, a MaxLogMAP decoder, a turbo decoder and soft-output Viterbi algorithm. Note that it is not required to have each of the inner demappers and outer decoders listed. Also, other demappers and outer decoders may be used as well.

Based on a channel classification performed by the receiver, controller 321 causes the MIMO demapper and the outer coders to be adapted as described above. The specific inner demapper and outer decoder configuration is implemented with a hardware or software switch, in a manner well-known in the art.

An Example of an Inner Decoder Structure

In one coding mode, after OFDM front-end preprocessing, the samples from each receive antenna and on each tone are passed through an inner/outer soft-in soft-out decoder structure for decoding shown in FIGS. 3 and 4, which are described above. Also as described above, in one embodiment, the outer decoder of one coding mode is an optimal (soft-in soft-out) MAP decoder. The complexity of the near-optimal receivers associated with these types of coded OFDM/BICM/OFDM systems resides in the inner decoder of the receiver structure in FIG. 3.

In one embodiment, the channel state information (CSI) is not available at the transmitter, but CSI is fully available at the receiver; that is, the set of H's is known at the receiver but not at the transmitter.

On each OFDM tone, N QAM symbols are transmitted simultaneously (with N at least 1 and no larger than the minimum of $N_t$ and $N_r$) and each of the $N_r$ receive antennas receives a linear combination of these N symbols (whereby the linear combination is dictated by the instantaneous channel coefficients).

Advantages of Embodiments of the Invention

An advantage of embodiments of the invention is that the rate of the SU-MIMO system is matched to the supportable rate of the channel. Attempting to use a SU-MIMO system at a rate which is too high in comparison to a channel rate which can be supported leads to an outage event. Likewise, operating the SU-MIMO at too low a rate relative to that which can be safely supported by the channel means that the system is under-performing. This, of course, assumes that the system configuration is such that those higher rates can be supported.

Another advantage of embodiments of the invention is its simplicity of operation, and its ability to provide the relevant information needed by conventional scheduling algorithms. For instance, in the context of a proportional fair scheduling algorithm, this type of closed-loop rate adaptation scheme provides (among other parameters) the maximum rate achievable on the given MIMO channel to that user. This is the quantity needed for scheduling in these algorithms. In contrast, MIMO systems feeding back CQI type parameters do not provide precise information about the maximum achievable rate. For instance, two channels with the same CQI but different channel scattering richness levels can have drastically different achievable rates. As the proposed metrics are designed to capture these achievable rates, they do not suffer from the problems associated with CQI feedback. The achievable rate also depends on the modem constellation used in the encoder. Hence, different modems could achieve different rates over the same channel. Furthermore, the set of encoder modes that can be supported by a channel also depend on the available library of decoder options. In addition, the rate required in the feedback channel by the teachings described herein is very low. Assuming there is a total of T operating coding modes (i.e., combinations of constellation, outer binary code type and outer binary code rate), a total of $\log_2 T$ bits of feedback are at most required. In practice, the number of required feedback bits may be smaller, as only a few of the possible T modes may be viable at any given time for a user terminal, and thus the feedback representation need only distinguish modes within this smaller set.

Note that one class of receivers, one class of modulation schemes, one class of outer binary codes and one set of antennas have been used for the purpose of example only. Other choices are also possible within the framework teachings disclosed herein.

More generally, the classifier may choose the operating mode taking into account the performance/complexity trade-offs of the receiver structures associated with different coding modes. For instance, depending of the available battery resources (or user-selected battery usage settings), the classifier might consider different subsets of receiver structures in selecting the coding scheme. In a low receiver-complexity setting, a coding mode with a lower effective rate might be selected to guarantee low power usage.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless communication system comprising:
a base station having a transmitter that is operable to transmit wireless signals using a plurality of transmission options; and
a user terminal having a receiver that is operable to receive and decode wireless signals using a plurality of receiver algorithms, the user terminal operable
to receive communications from the transmitter over a multiple-input, multiple output (MIMO) channel,
to select at least one coding mode to be used by the transmitter on the channel based on rates achievable using MIMO transmission, in view of the channel information, using different combinations of one of the plurality of receiver algorithms and one of the plurality of transmission options,
to send information to identify the at least one coding mode to the base station using a feedback channel, each coding mode specifying at least an encoder to be used by the transmitter for the channel; and
wherein the user terminal comprises a classifier to select a pair comprising one encoder for use by the transmitter and one decoder for use by the receiver based on classification of the channel calculated via a metric that depends on channel mutual information and information indicative of the encoding mode.

2. The system defined in claim 1 wherein the channel information comprises channel mutual information of the channel for a given transmission modem.

3. The system defined in claim 1 wherein the user terminal selects the pair based on receiver criteria.

4. The system defined in claim 1 wherein the user terminal selects a pair comprising one encoder for use by the transmitter and one decoder for use by the receiver based on QoS constraints.

5. The system defined in claim 1 wherein the user terminal selects a pair comprising one encoder for use by the transmitter and one decoder for use by the receiver because the pair supports the highest possible rate with a given QoS criteria and given receiver constraints in comparison to one or more other encoder and decoder pairs.

6. The system defined in claim 1 wherein the information indicative of the coding mode comprises coding parameters.

7. The system defined in claim 6 wherein the coding parameters include one or more of constellation size, modulation type format, mapper, outer code type, memory, and coding rate.

8. The system defined in claim 1 wherein the base station comprises:
a transmitter; and
an adaptation unit coupled to the transmitter to change the encoding performed by the transmitter based on a selection by a receiver in the system, the selection being indicated through receiver feed back from the receiver in the system.

9. The system defined in claim 8 wherein the feedback comprises:
an index specifying an outer code rate;
a modem;
a constellation size; and
a number of coded streams.

10. A wireless communication system comprising:
a base station having a transmitter that is operable to transmit wireless signals using a plurality of transmission options; and
a user terminal having a receiver that is operable to receive and decode wireless signals using a plurality of receiver algorithms, the user terminal operable:
to receive communications from the transmitter over a multiple-input, multiple output (MIMO) channel,
to select at least one coding mode to be used by the transmitter on the channel based on rates achievable using MIMO transmission, in view of the channel information, using different combinations of one of the plurality of receiver algorithms and one of the plurality of transmission options, and
to send information to identify the at least one coding mode to the base station using a feedback channel, each coding mode specifying at least an encoder to be used by the transmitter for the channel;
wherein the base station comprises the transmitter and an adaptation unit coupled to the transmitter to change the encoding performed by the transmitter based on a selection by a receiver in the system, the selection being indicated through receiver feed back from the receiver in the system; and
wherein the transmitter further comprises:
an input to receive information bearing signals,
a configurable binary outer-code encoder coupled to the input to encode the information bearing signal and generate a bit stream using a binary code selected from a set of binary codes based on feedback from the receiver,
a bit-interleaver coupled to the bit stream, and followed by a configurable mapper and a configurable modem, to perform bit-interleaved coded modulation (BICM) on the bit stream, wherein the mapper and modem are configured to one of a set of mappers and modems based on the feedback from the receiver from a library of pairs of mappers and modems, a serial-to-parallel converter that is operable to convert outputs of the bit-interleaver from serial to parallel form, and an OFDM-based encoder coupled to the serial-to-parallel converter to generate one or more data streams for OFDM transmission.

11. The system defined in claim 10 wherein the set of binary outer codes comprises two one or more of a punctured convolutional code, a turbo code, and a block code such as an LDPC code.

12. The system defined in claim 10 wherein the set of mappers and modems comprises one or more of: Gray mappers with BPSK, QPSK, 16-QAM, 64-QAM, 256-QAM, 1024-QAM, and 8-PSK, and set partition mappers with 16-QAM, 64-QAM, 256-QAM, 1024-QAM, and 8-PSK.

13. The system defined in claim 1 wherein the user terminal comprises:
a decoder;
a channel state information unit to obtain channel state information corresponding to a wireless communication channel between the user terminal and a base station in the wireless communication system for each encoding mode in the system; and
a channel classifier responsive to the channel state information to select the at least one coding mode to be used by the transmitter on the channel; and
to select the decoding mode to be used by the decoder and to signal information indicative of the decoding mode to the decoder, the decoder reconfiguring itself to operate using the decoding mode in response to receiving the information indicative of the decoding mode.

14. The system defined in claim 13 wherein the information comprises an outer code rate, a constellation size, and a number of streams generated for OFDM transmission.

15. A wireless communication system comprising:
a base station having a transmitter that is operable to transmit wireless signals using a plurality of transmission options; and
a user terminal having a receiver that is operable:
to receive and decode wireless signals using a plurality of receiver algorithms, the user terminal operable to receive communications from the transmitter over a multiple-input, multiple output (MIMO) channel,
to select at least one coding mode to be used by the transmitter on the channel based on rates achievable using MIMO transmission, in view of the channel information, using different combinations of one of the plurality of receiver algorithms and one of the plurality of transmission options, and
to send information to identify the at least one coding mode to the base station using a feedback channel, each coding mode specifying at least an encoder to be used by the transmitter for the channel;
wherein the user terminal comprises:
a decoder,
a channel state information unit to obtain channel state information corresponding to a wireless communication channel between the user terminal and a base station in the wireless communication system for each encoding mode in the system,
a channel classifier responsive to the channel state information to select the at least one coding mode to be used by the transmitter on the channel and to select the decoding mode to be used by the decoder and to signal information indicative of the decoding mode to the decoder, the decoder reconfiguring itself to operate using the decoding mode in response to receiving the information indicative of the decoding mode, and
wherein the channel classifier calculates an estimate of the supportable rate for the channel for each coding mode in the system, where the estimate is an estimate of the mutual information between the transmitter and the receiver for said each encoding mode.

16. The system defined in claim 13 further comprising a memory, communicably coupled to the channel classifier, to store gap-from-capacity parameters for each pair of an encoder and decoder.

17. The system defined in claim 13 wherein the decoder comprises:
a linear front-end having an inner decoder to perform decoding with OFDM to generate symbols;
a configurable inner symbol demapper to perform a symbol-by-symbol demapping of symbols to bits from the linear front-end, the inner symbol demapper configured to one of a group of demappers in response to information from the channel classifier;
a bit deinterleaver to perform deinterleaving on the demapped symbols received from the inner symbol demapper; and
a configurable outer decoder to decode a first set of data output by the demapper to produce output data from the receiver, the outer decoder configured to one of a group of outer decoders in response to information from the channel classifier.

18. The system defined in claim 17 wherein the configurable inner symbol demapper is configured to one selected from a group of demappers consisting of a non-iterative MMSE demapper, an iterative MMSE demapper, an iterative SOMA-based demapper with an MMSE front-end, a MAP demapper, a MaxLogMAP demapper, and soft-output spherical decoders.

19. The system defined in claim 17 wherein the configurable outer decoder is configured to one selected from a group of outer decoders consisting of a Viterbi decoder, a MAP decoder, a MaxLogMAP decoder, a turbo decoder and soft-output Viterbi algorithm.

20. A user terminal for use in a wireless communication system comprising a base station, the base station having a transmitter that is operable to transmit wireless signals using a plurality of transmission options, the user terminal comprising:
a receiver that is operable to receive and decode wireless signals using a plurality of receiver algorithms;
a channel state information unit to obtain channel state information corresponding to a wireless communication channel between the user terminal and a base station in the wireless communication system for each encoding mode in the system;
a transceiver classifier and selector responsive to the channel state information to select at least one coding mode to be used by the transmitter on the channel based on rates achievable using MIMO transmission, in view of the channel state information, using different combinations of one of the plurality of receiver algorithms and one of the plurality of transmission options, and to send information to identify the at least one coding mode to the base station using a feedback channel, each coding mode specifying at least an encoder to be used by the transmitter for the channel; and
wherein the transceiver classifier and selector are to select a pair comprising one encoder for use by the transmitter and one decoder for use by the receiver based on classification of the channel calculated via a metric that depends on channel mutual information and information indicative of the encoding mode.

21. A method comprising:

estimating a MIMO channel at a receiver in a wireless communication system, the channel for communications between a transmitter at a base station and the receiver;

determining, at the receiver, which coding modes can support communication over the channel between a transmitter and the receiver at a target performance level by determining achievable MIMO transmission rates using different combinations of one of the plurality of receiver algorithms and one of the plurality of transmission options in view of channel state information, each of the coding modes comprising an encoder for MIMO transmission over the channel;

selecting one of the coding modes at the receiver; and sending information indicative of an encoder of the selected coding mode to the transmitter over a feedback channel between the receiver and the transmitter; and wherein determining the coding modes is based on a computed maximum throughput that can be supported by the channel with a given encoding mode and values indicative of a gap from capacity for a given encoder/decoder pair.

22. The method defined in claim 21 wherein the channel is estimated using pilots.

23. The method defined in claim 21 further comprising selecting an encoding mode including the transmission rate, outer code type and rate, the size and type of the constellation modem, the type of mapper, and the number of transmitted OFDM streams.

* * * * *